United States Patent
Yang

(10) Patent No.: US 9,343,766 B2
(45) Date of Patent: *May 17, 2016

(54) FUEL CELL SYSTEM

(71) Applicant: KYUNGDONG NAVIEN CO., LTD., Pyeongtaek-si, Gyeonggi-do (KR)

(72) Inventor: Dong Jin Yang, Yeosu-si (KR)

(73) Assignee: Kyungdong Navien Co., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/405,153

(22) PCT Filed: Mar. 28, 2013

(86) PCT No.: PCT/KR2013/002594
§ 371 (c)(1),
(2) Date: Dec. 2, 2014

(87) PCT Pub. No.: WO2013/183853
PCT Pub. Date: Dec. 12, 2013

(65) Prior Publication Data
US 2015/0194687 A1     Jul. 9, 2015

(30) Foreign Application Priority Data

Jun. 4, 2012 (KR) .................. 10-2012-0059675

(51) Int. Cl.
*H01M 8/06* (2006.01)
*H01M 8/04* (2006.01)
*H01M 8/24* (2006.01)

(52) U.S. Cl.
CPC ........ *H01M 8/0618* (2013.01); *H01M 8/04022* (2013.01); *H01M 8/04067* (2013.01); *H01M 8/04074* (2013.01); *H01M 8/04268* (2013.01); *H01M 8/0625* (2013.01); *H01M 8/0662* (2013.01); *H01M 8/2475* (2013.01); *Y02E 60/50* (2013.01)

(58) Field of Classification Search
None
See application file for complete search history.

(56) References Cited

U.S. PATENT DOCUMENTS

2001/0049039 A1* 12/2001 Haltiner, Jr. .................... 429/24
2002/0025458 A1*  2/2002 Faville et al. .................. 429/13

(Continued)

FOREIGN PATENT DOCUMENTS

| JP | 2006-318909 A | 11/2006 |
| KR | 10-2007-0096971 A | 10/2007 |
| KR | 10-2009-0078700 A | 7/2009 |

OTHER PUBLICATIONS

KPION Machine Translation of KR 10-2009-0078700 (Jul. 2009).*

(Continued)

*Primary Examiner* — Gregg Cantelmo
(74) *Attorney, Agent, or Firm* — Stein IP, LLC

(57) ABSTRACT

The present invention relates to a fuel cell system, and comprises: a hot box for accommodating a fuel cell and a fuel reformer; a start burner for heating the temperature of the hot box to a reaction temperature during an initial drive; a first heat exchange portion for heating outside air which is aspirated by using heat from the start burner or heat from the exhaust gas, and supplying the air to the fuel cell; and a second heat exchange portion for supplying steam which is generated by using the heat from the exhaust gas, and maintaining the reaction temperature by cooling the fuel cell with the exhaust gas of which the temperature has been lowered.

4 Claims, 2 Drawing Sheets

(56) References Cited

U.S. PATENT DOCUMENTS

2005/0164051 A1* 7/2005 Venkataraman et al. ....... 429/17
2007/0231631 A1* 10/2007 Venkataraman ................ 429/19
2010/0062298 A1* 3/2010 Valensa .......................... 429/19
2011/0281185 A1* 11/2011 Sridhar et al. ................ 429/408

OTHER PUBLICATIONS

International Search Report dated Jul. 31, 2013, issued to corresponding International Application No. PCT/KR2013/002594.

* cited by examiner

FUEL CELL SYSTEM

CROSS-REFERENCE TO RELATED APPLICATIONS

This invention is a national stage of International Application No. PCT/KR2013/002594, filed Mar. 28, 2013, which claims the benefit of priority to Korean Application No. 10-2012-0059675, filed Jun. 4, 2012, in the Korean Intellectual Property Office. All disclosures of the documents named above are incorporated herein by reference.

BACKGROUND OF THE INVENTION

1. Field of the Invention

The present invention relates to a fuel cell system, and more particularly to a fuel cell system capable of preventing a decrease in efficiency which is caused by directly supplying room-temperature outside air into a hot box to affect a temperature of the hot box.

2. Description of the Related Art

In general, most of energies used by humans have been obtained from fossil fuels. However, the use of the fossil fuels has significantly adverse effects on environment, such as air pollution, acid rain, global warming, and also brings about a problem of low energy efficiency.

To solve the problems caused by using the fossil fuels, fuel cell systems have been recently developed. The fuel cells are different from typical secondary batteries in that the fuel cells have a structure in which electricity is generated by supplying fuels, such as hydrogen gas or hydrocarbon, to an anode and supplying oxygen to a cathode.

That is, fuel cells are referred to as "cells", however in reality, may be regarded as power generators for generating electricity. Basically, the fuel cells employ a method in which fuels are not combusted but an electro-chemical reaction between hydrogen and oxygen is triggered, and an energy difference before and after the reaction is converted to electrical energy.

The fuel cells do not generate gases, such as NOx and SOx, which cause environmental pollution, and are noiseless and vibrationless systems, so that the fuel cells may be considered a clean power-generation system having the thermal efficiency of 80% or more by adding up an electricity generation amount and a heat collecting amount.

The reaction between hydrogen and oxygen in a fuel cell is an exothermic reaction, and thus generates heat. Phosphoric acid is mainly used as an electrolyte in the fuel cell, and such a phosphoric acid fuel cell is known to have an operation temperature of about 200° C. This temperature is a maximum allowable temperature for a phosphoric acid electrolyte. The reaction between hydrogen and oxygen is most actively performed at about 200° C., which is a reaction temperature of a fuel cell; however, heat is generated by the exothermic reaction between hydrogen and oxygen and thus the reaction between hydrogen and oxygen is not readily performed, thereby leading to a decrease in efficiency. Accordingly, a cooling structure for cooling the fuel cell is essentially required.

Also, as another example of a fuel cell, there is a molten carbonate type fuel cell in which a mixture of lithium carbide and potassium carbide which have a low melting point is used as an electrolyte. An operation temperature of the molten carbonate type fuel cell is about 650° C., and a hot box is installed to maintain the operation temperature.

In order to maintain the operation temperature having a close relation with the efficiency of the fuel cell and to improve power generation efficiency, various fuel cell systems have been proposed.

For example, Korean Patent No. 10-0787244 discloses a structure, which includes an air supply unit for supplying oxygen-containing air for effective combustion of raw materials for power generation, and which uses a double intake method of allowing outside air to be introduced for properly lowering the temperature of a hot box to a proper level.

Also, Korean Patent No. 10-0787244 discloses a structure, in which a carbon monoxide remover for removing carbon monoxide is connected to an intake passage in order to supply oxygen-containing air.

However, this structure directly supplies air which is supplied through an outside air intake container, an air intake port, and a filter, to a fuel treatment unit, etc., by using an air supply pressure adjustment unit. Because room-temperature air is directly supplied and used, there may be a phenomenon that an internal temperature of the hot box is lowered.

When the temperature of the hot box is thus lowered than a reaction temperature, there is a problem in that power generation efficiency may be lowered.

SUMMARY OF THE INVENTION

Technical Problem

The present invention is provided to solve the above-described problems. An object of the present invention is to provide a fuel cell system which can minimize an internal temperature variation of a hot box caused by intaken outside air.

Another object of the present invention is to provide a fuel cell system which can simplify a system structure by unifying an air intake line.

Technical Solution

Embodiments of the present invention provide a fuel cell system including: a hot box accommodating a fuel cell and a reformer; a start burner heating the hot box to a reaction temperature during an initial operation; a first heat exchange portion which heats outside air by using heat from the start burner or heat from exhaust gas and supplies the heated air into the hot box; and a second heat exchange portion generating steam using heat from the exhaust gas, supplying the steam, and maintaining the reaction temperature by cooling the fuel cell using the exhaust gas having a lowered temperature.

In an embodiment, the reformer may include a reforming portion receiving the raw material gas and the steam, and reforming the gas and the steam into hydrogen gas; and a burner for heating the reforming portion.

In another embodiment, the burner may heat the reforming portion by an exothermic reaction in which unreacted oxygen and hydrogen after a reaction in the fuel cell are reacted.

In another embodiment, the burner may include a primary burner and a secondary burner, and the unreacted oxygen and hydrogen are sequentially supplied to the primary and secondary burners to thereby minimize the unreacted gas.

In another embodiment, the system may further include a combustion gas line provided to surround the inside of the hot box, connected to the first heat exchange portion, and maintaining the reaction temperature by heating the hot box using heat from the start burner and by cooling the hot box using the exhaust gas from the second heat exchange portion.

Advantageous Effects

The fuel cell system according to the present invention is equipped with a means for heating outside air during an initial operation, continuously heats intaken outside air using exhaust gas, and supplies the heated air to prevent an internal temperature variation of a hot box caused by an intake of outside air, thereby maintaining a temperature of a hot box at a reaction temperature to prevent a decrease in power generation efficiency.

Also, the system of the present invention is configured to use exhaust gas to generate steam for reforming raw material gas, and relieve an increased amount of heat generated in a fuel cell, and to heat introduced outside air. Thus, the present invention has effects of enhancing efficiency of a system configuration and simplifying the configuration.

Also, the fuel cell system according to the present invention unifies an intake line and an exhaust line respectively, thereby simplifying a system structure.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing of which.

DESCRIPTION OF THE REFERENCE SYMBOLS

| | |
|---|---|
| 100: Start burner | 110: Combustion gas line |
| 200: First heat exchange portion | 300: Hot box |
| 400: Reformer | 410: Primary burner |
| 410: Reforming portion | 430: Secondary burner |
| 440: Exhaust gas pipe | 500: Fuel cell |
| 510: Cathode | 520: Anode |
| 530: Connection pipe | 600: Second heat exchange portion |

DESCRIPTION OF THE EMBODIMENTS

Figure 1:
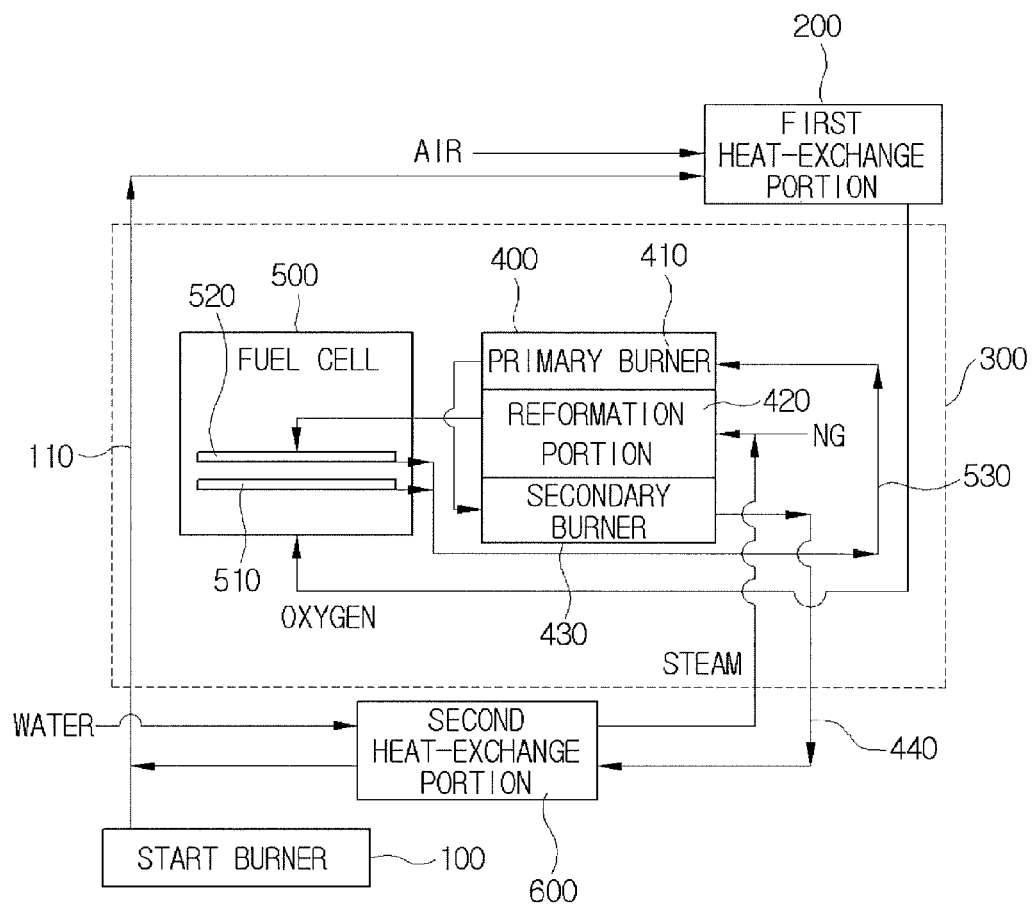
FIG. 1 is a block diagram illustrating a fuel cell system according to a preferred embodiment of the present invention.

FIG. 1 is a block diagram illustrating a fuel cell system according to a preferred embodiment of the present invention.

Referring to FIG. 1, the fuel cell system according to a preferred embodiment of the present invention includes: a start burner 100 for heating the hot box 300 in an initial operation; a first heat exchange portion 200 for heating outside air by using heat of the start burner 100 or heat of exhaust gas and supplying the heated air into the hot box 300; a reformer 400 located in the hot box 300, and reforming raw material gas NG; a fuel cell 500 for generating electricity through a catalytic reaction after receiving the outside air heated by the first heat exchange portion 200 and the reformed raw material gas from the reformer 400; a second heat exchange portion 600 receiving unreacted exhaust gas in the fuel cell 500 through the reformer 400, generating steam using sensible heat of the unreacted exhaust gas, supplying the steam with raw material gas NG to the reformer 400, and discharging the heat-exchanged unreacted exhaust gas to the air through the first heat exchange portion 200.

Hereinafter, a structure and functions of a fuel cell system according to a preferred embodiment of the present invention having the above-described configuration will be described in more detail.

The hot box 300 serves to prevent outside air from contacting the reformer 400 and the fuel cell 500 accommodated therein to maintain a reaction temperature. The hot box 300 is required to be preheated to the reaction temperature to enhance power generation efficiency even in an initial operation.

In order to satisfy such operation conditions of the hot box 300, the hot box 300 is heated to the reaction temperature using the start burner 100 in an initial operation. Assuming the reaction temperature in the fuel cell 500 to be 750° C., a combustion gas line 110 for supplying air heated by the start burner 100 to the hot box 300 is prepared and the hot box 300 is heated to the temperature of 750° C.

Although the combustion gas line 110 is illustrated in FIG. 1 to pass through the hot box 300 vertically for convenience of description, the combustion gas line 110 really has a wound structure inside the hot box 300.

Figure 2:
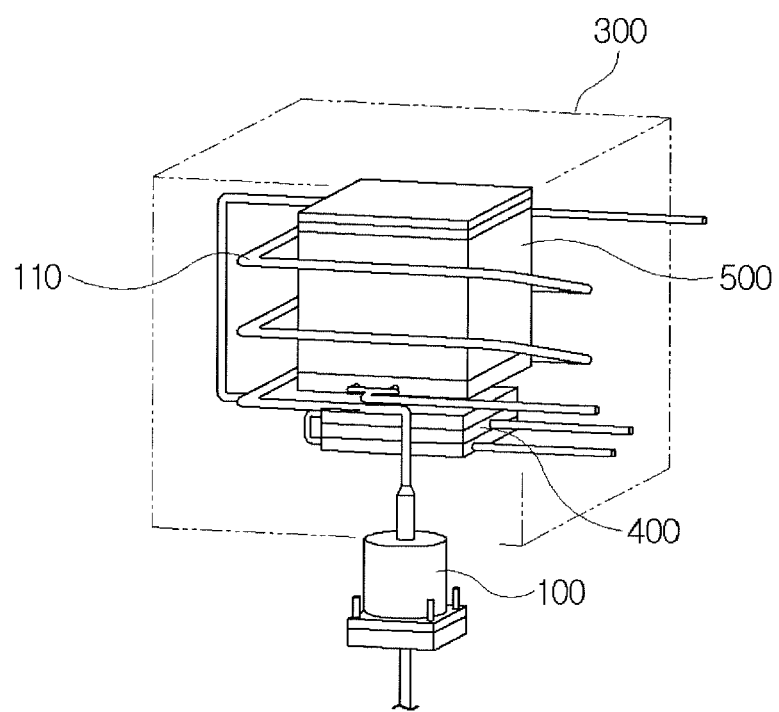
FIG. 2 is a configuration diagram illustrating a coupling relation of a fuel cell system according to a preferred embodiment of the present invention.

FIG. 2 is a configuration diagram illustrating a coupling relation of a fuel cell system according to a preferred embodiment of the present invention.

Referring to FIG. 2, it can be seen that the combustion gas line 110 is disposed inside the hot box 300 and wrapped around the fuel cell multiple times while being spaced apart by a predetermined distance over an outer surface of the fuel cell 500.

In FIG. 2, the start burner 100, the hot box 300, the reformer 400 and the fuel cell 500 are illustrated, and structures of the first and second heat exchangers 200 and 600 are omitted.

The reformer 400 and the fuel cell 500 which are provided inside the hot box 300 are configured such that they are disposed up and down with respect to each other, whereby an overall apparatus may be reduced in size.

As described above, the start burner 100 stops operation in a state where the hot box 300 is heated to the reaction temperature by the start burner 100.

The combustion gas line 110 is connected to the first heat exchange portion 200 and serves to heat the outside air, which is supplied from the first heat exchange portion 200 to the hot box 300, through heat exchange.

Here, when the room-temperature outside air is introduced, an internal temperature of the hot box 300 may be lowered, and an internal temperature variation of the hot box 300 may be minimized by allowing the outside air to be heated and then supplied.

Accordingly, a decrease in reaction efficiency, that is, a decrease in power generation efficiency may be prevented, and a temperature change of overall system is readily expected. Thus, it is easy to a design the system such that the system operates in an accurate temperature range.

The heated outside air contains oxygen, and the heated outside air containing oxygen is introduced into the hot box 300 and is supplied to a cathode 510 of the fuel cell 500.

Hydrogen is supplied to an anode 520 of the fuel cell 500, and power generation is performed by a reaction between hydrogen and oxygen. The reformer 400 is used for supplying hydrogen to the anode 520.

The reformer 400 includes a reforming portion 420, a primary burner 410, and a secondary burner 430, wherein the reforming portion 420 receives raw material gas NG and steam of the second heat exchange portion 600 to reform them and supplies the hydrogen gas to the fuel cell 500 side.

If necessary, the reformer may have a function of removing carbon monoxide by oxidization. The reforming reaction performed in the reforming portion 420 of the reformer 400 is an endothermic reaction and a continuous supply of heat is necessary to continue the reforming reaction.

In order to supply the heat, the reforming portion 420 is heated by the primary and secondary burners 410 and 430.

The primary and secondary burners 410 and 430 are catalyst burners, and heat the reforming portion 420 with heat of about 800 to about 900° C. by an exothermic reaction caused by reaction between hydrogen and oxygen in the unreacted gas discharged from the fuel cell 150, thereby triggering a reformation reaction.

The reformed raw material gas NG is supplied to the anode 520 of the fuel cell 500.

Hydrogen is supplied to the anode 520 of the fuel cell 500, and oxygen is supplied to the cathode 510, so that power is generated by an electrical reaction between hydrogen and oxygen. This reaction between oxygen and hydrogen is an exothermic reaction, and accordingly, a temperature of the fuel cell 500 and a temperature inside the hot box 300 are increased.

Since the increase in the temperature of the fuel cell 500 and the internal temperature of the hot box 300 may cause power generation efficiency of the fuel cell to be lowered again, it is necessary to reduce the temperature to a reaction temperature by cooling. The cooling process will be described later in more detail.

Power is generated by a reaction between oxygen and hydrogen in the fuel cell 500, and other gases uninvolved in the reaction, or unreacted oxygen and hydrogen, and water vapor mixed with the unreacted oxygen and hydrogen are discharged through the connection pipe 530 which is located at the other sides of the cathode 510 and the anode 520.

The connection pipe 530, through which the exhaust gas is discharged, is sequentially connected to the primary and secondary burners 410 and 430, and the unreacted oxygen and hydrogen are sequentially supplied to the primary and secondary burners 410 and 430, so that an exothermic reaction, in which oxygen and hydrogen are reacted, is caused to occur.

Heat generated at this point is about 800 to about 900° C. as described above, and is supplied to the reforming portion 420 so that a gas mixture of raw material gas and steam is reformed into hydrogen gas.

Why the burner for heating the reforming portion 420 is divided into the primary burner 410 and the secondary burner 430 is because a discharge of unreacted gas is minimized by gradually reacting oxygen and hydrogen contained in the exhaust gas.

Afterwards, the exhaust gas discharged from the secondary burner 430 is discharged out of the hot box 300 through the exhaust gas pipe 440.

The exhaust gas discharged through the exhaust gas pipe 440 is heated by the primary and secondary burners 410 and 430 and has a temperature close to the reaction temperature. The exhaust gas is supplied to the second heat exchange portion 600 and is heat-exchanged with water supplied from the outside.

The water heat-exchanged with the exhaust gas in the second heat exchange portion 600 is phase-changed into a steam state, and is mixed with the raw material gas NG as described above, and is supplied to the reforming portion 420 as described above.

Also, the exhaust gas deprived of heat by the water in the second heat exchange portion 600 is supplied to the combustion gas line 110 and supplied again into the hot box 300. The exhaust gas supplied into the hot box 300 is in a state where a temperature is lowered in the second heat exchange portion 600, and this cools the hot box heated by an exothermic reaction of the fuel cell 500, so that the temperature of the hot box 300 is lowered to the reaction temperature.

Accordingly, the internal temperature of the hot box 300 may be continuously maintained at the reaction temperature, and the reaction between hydrogen and oxygen is readily performed in the fuel cell 500, so that a decrease in power generation efficiency may be prevented.

The exhaust gas passing through the hot box 300 is supplied again to the first heat exchange portion 200. The exhaust gas is heated again while passing through the hot box 300, and heats the outside air by heat-exchanging with the outside air introduced from the first heat exchange portion 200.

As described above, the outside air is heated and then is supplied into the hot box 300, thereby making it possible to prevent a change in an internal temperature of the hot box 300 caused by supply of the room-temperature outside air.

The exhaust gas heat-exchanged with the outside air is discharged to the outside.

Thus, according to the present invention, by heating outside air to be supplied, it is possible to prevent a change in an internal temperature of the hot box 300 which may be caused when the room-temperature outside air is supplied. Therefore, a decrease in power generation efficiency may be prevented and the temperature increase by an exothermic reaction of the fuel cell 500 may also be reduced using the exhaust gas.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A fuel cell system, comprising:
   a hot box accommodating a fuel cell and a reformer;
   a start burner for heating the hot box so that the temperature of the hot box is raised to a reaction temperature in an initial operation;
   a first heat exchange portion which heats inhaled outside air by using heat of the start burner or heat of exhaust gas and supplies the heated air into the hot box;
   a second heat exchange portion generating steam using heat of the exhaust gas, supplying the steam to the reformer, and maintaining the reaction temperature by cooling the fuel cell using the exhaust gas having a lowered temperature; and
   a combustion gas line provided to surround the fuel cell inside of the hot box, connected to the first heat exchange portion, and maintaining a reaction temperature by heating the hot box using heat of the start burner and by cooling the hot box using the exhaust gas from the second heat exchange portion;
   wherein
   the first heat exchange portion and the second heat exchange portion are equipped outside of the hot box, and the exhaust gas sequentially passes through the second heat exchange portion, the second heat exchange portion, and the first heat exchange portion.

2. The system of claim 1, wherein the reformer comprises:
a reforming portion receiving the raw material gas and the steam, and reforming the gas and the steam into hydrogen gas, and
a burner heating the reforming portion.

3. The system of claim 2, wherein the burner heats the reforming portion by an exothermic reaction in which unreacted oxygen and hydrogen after a reaction in the fuel cell are reacted.

4. The system of claim 3, wherein the burner comprises a primary burner and a secondary burner, and the unreacted oxygen and hydrogen are sequentially supplied to the primary and secondary burners.

* * * * *